United States Patent
Suman (10) Patent No.: US 9,811,705 B1
(45) Date of Patent: Nov. 7, 2017

(54) ILLUMINATION SYSTEM WITH ACTIVE ELEMENT FOR GENERATING DIFFERENT ILLUMINATION PATTERNS FOR A DATA READER

(71) Applicant: Datalogic IP Tech, S.r.l., Lippo di Calderara (IT)

(72) Inventor: Michele Suman, Padua (IT)

(73) Assignee: DATALOGIC IP TECH S.R.L., Lippo di Calderara di Reno (Bologna) (IT)

( * ) Notice: Subject to any disclaimer, the term of this patent is extended or adjusted under 35 U.S.C. 154(b) by 0 days.

(21) Appl. No.: 15/151,328

(22) Filed: May 10, 2016

(51) Int. Cl.
  *G06K 7/10* (2006.01)
  *G06K 19/06* (2006.01)

(52) U.S. Cl.
  CPC ..... *G06K 7/10881* (2013.01); *G06K 7/10732* (2013.01); *G06K 19/06037* (2013.01)

(58) Field of Classification Search
  CPC . G06K 7/10; G06K 9/22; G06F 17/00; G02B 5/08; G02B 26/00
  USPC ................. 235/462.45, 472.01, 375, 462.36
  See application file for complete search history.

(56) References Cited

U.S. PATENT DOCUMENTS

| | | | |
|---|---|---|---|
| 6,832,725 B2 | 12/2004 | Gardiner et al. | |
| 7,028,901 B2 | 4/2006 | Carlson | |
| 7,510,120 B2 | 3/2009 | Reichenbach et al. | |
| 7,543,754 B2 | 6/2009 | He et al. | |
| 8,028,913 B2 | 10/2011 | Liu et al. | |
| 8,061,610 B2 | 11/2011 | Nunnink | |
| 8,118,226 B2 | 2/2012 | Olmstead et al. | |
| 8,500,023 B2 | 8/2013 | Zolotov | |
| 8,505,823 B2 | 8/2013 | Bhagwan et al. | |
| 8,752,768 B2 | 6/2014 | Gao | |
| 8,998,092 B2 | 4/2015 | Gao | |
| 2011/0058240 A1* | 3/2011 | Dell'Eva | G02B 5/32 359/23 |
| 2012/0145791 A1* | 6/2012 | Gregerson | G06K 7/10702 235/470 |
| 2013/0070317 A1* | 3/2013 | Allen | H04N 1/024 358/475 |
| 2013/0284809 A1* | 10/2013 | Joseph | G06K 7/10742 235/462.42 |

\* cited by examiner

*Primary Examiner* — Edwyn Labaze
(74) *Attorney, Agent, or Firm* — Stoel Rives LLP (57) ABSTRACT

A data reader for reading and decoding a code from an item. The data reader includes an imager operable to form an image of the code from an item located in a field of view of the data reader. The data reader further includes an illumination system including optics arranged to direct light from one or more illumination sources along one of a variety of different optical paths to illuminate the field of view of the data reader with one of a plurality of light patterns. The data reader also includes an active element controllable to selectively direct the light along one of the optical paths.

19 Claims, 7 Drawing Sheets

ILLUMINATION SYSTEM WITH ACTIVE ELEMENT FOR GENERATING DIFFERENT ILLUMINATION PATTERNS FOR A DATA READER

BACKGROUND

The field of the present disclosure relates generally to systems and methods for reading optical data, and in particular, to such systems and methods capable of generating different illumination patterns for improved data reading processes.

Optical codes, such as barcodes and other machine-readable indicia, appear in a variety of applications. For example, optical codes can be used to identify a class of objects (e.g., merchandise) or unique items (e.g., patents). As a result, optical codes are found on a wide variety of objects, such as retail goods, company assets, and documents. Typically, the optical codes are placed on items and read as the items arrive or as they are sold to help track production at manufacturing facilities or inventory at stores. Optical codes come in a variety of forms, such as: linear barcodes (e.g., UPC code), 2D codes including stacked barcodes (e.g., PDF-417 code), and matrix codes (e.g., Datamatrix code, QR code, or Maxicode). Typically, in a grocery or retail establishment, such optical codes are often printed on tags or stickers affixed to the item and/or printed directly on the item packaging.

However, for many applications, it may be challenging to use printed tags or labels, such as for items that need to pass through harsh testing processing (e.g., chemicals, agents, thermal cycles, oil, moisture, etc.), or items that need continuous tracking for extended periods of time (e.g., the product lifecycle), or for small items that are difficult to label. In these cases, a printed label may be lost, damaged, or otherwise altered, thereby detrimentally affecting the label reading and decoding process.

To address these challenges, a marking technique known as direct part marking (DPM) has been developed to permanently imprint, etch, mold, or otherwise directly mark an item, product, or component with a machine-readable code, such as Data Matrix, QR codes, other high-density codes, or one-dimensional optical codes. Typically, a DPM code is comprised of multiple elements that are directly marked on an exterior surface of an item, such as a metal, wood, or plastic item. The optical codes may be captured and processed from the marked product using an imaging data reader.

Despite the ability to precisely control the marking process, one challenge with DPM technology is that DPM codes are often difficult to read because the surfaces and/or textures on which the DPM codes are marked may present reflectivity issues and/or provide low and inconsistent contrast. Accordingly, DPM data readers typically have a multi-faceted illumination system capable of providing sufficient illumination for handling DPM codes on a variety of surfaces, while minimizing specular reflection or other issues. The present inventors have identified a need for an improved and streamlined illumination system capable of providing proper illumination to allow a data reader to read DPM codes. Additional aspects and advantages of such data reading systems will be apparent from the following detailed description of example embodiments, which proceed with reference to the accompanying drawings.

Understanding that the drawings depict only certain embodiments and are not, therefore, to be considered limiting in nature, these embodiments will be described and explained with additional specificity and detail with reference to the drawings.

DETAILED DESCRIPTION OF DISCLOSED EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

Figure 1:
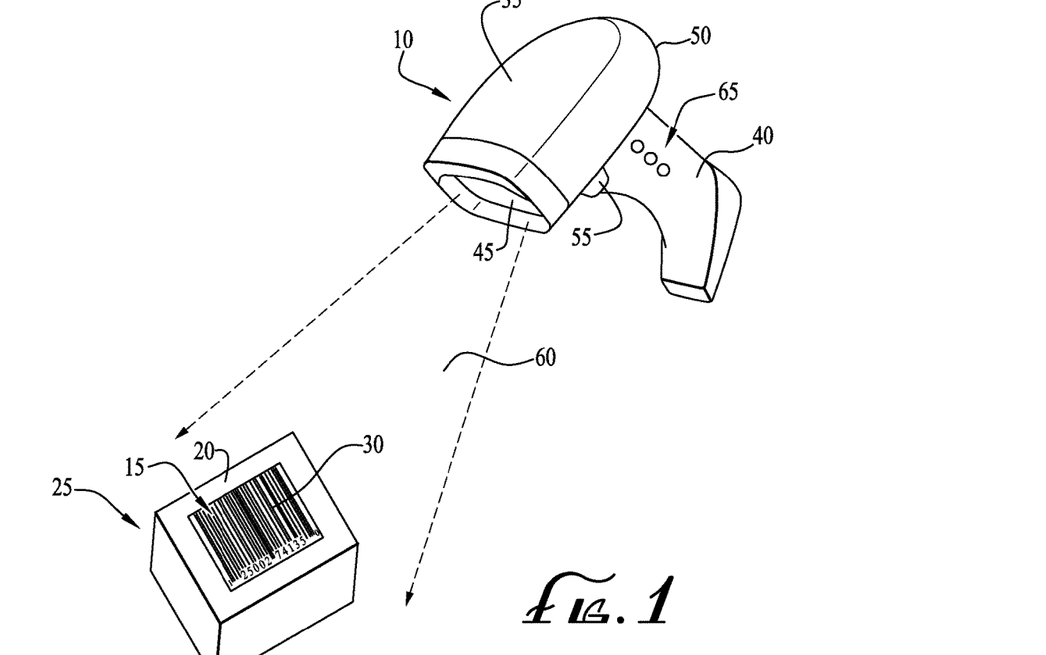
FIG. 1 schematically illustrates a handheld data reader for reading an optical code marked on an item surface in accordance with one embodiment.

FIG. 1 is a diagrammatic view of a data reader 10 in accordance with a first embodiment shown reading a DPM code 15 etched or otherwise directly marked on an exterior surface 20 of an item 25, which may be made of a metal, plastic, wood, or other suitable material. In some applications, the DPM code 15 is comprised of multiple elements 30 directly imprinted, etched, molded, or otherwise marked on the item 25. For example, the exterior surface 20 of a metallic item 25 may be etched such that the multiple elements 30 are sunken or depressed into the surface 20, or a plastic item 25 may be molded to include raised elements 30 on the exterior surface 20. It should be understood that although the DPM code 15 is depicted as a sequence of linear elements 30 in FIG. 1, the DPM code 15 may include symbols, designs, or other non-linear suitable elements in other applications.

With reference to FIG. 1, the data reader 10 is schematically depicted as a hand-held portable data reader suitable for reading codes, symbols, or other indicia. The reader 10 includes a housing 35 with a generally elongate handle 40 and a scan window 45 on an upper body portion 50. The handle 40 includes a manually actuatable trigger 55 operable to initiate an image capture process of the DPM code 15 for an item 25 located in a field of view 60 of the data reader 10.

In some embodiments, the handle 40 (or the upper body portion 50) of the data reader 10 may include an actuatable input mechanism 65, such as a button or set of buttons, that allow the user to select or toggle between different illumination options (as described in further detail with reference to FIGS. 2-13) for the data reader 10. In other embodiments, the data reader 10 may be configured as a fixed unit (mountable to a support surface or free standing on a horizontal surface) or may be a combined handheld/fixed unit, e.g., one that may rest/be self-supporting upon a horizontal surface but be grasped by the user and moved to aim toward an item to be read.

As mentioned previously, DPM codes 15 are often difficult to read for various reasons, such as (1) poor contrast between the marked elements 30 and the exterior surface 20, and/or (2) high reflectivity (e.g., specular reflection issues) of the exterior surface 20. Moreover, since the data reader 10 may be used to read DPM codes 15 marked on a wide variety of surfaces (e.g., metal, plastic, wood), the severity of the contrast and reflectivity issues may change depending on the item 25 from which the DPM code 15 is being read. Accordingly, it would be advantageous to incorporate an illumination system 100, 200, 300, 400 operable to generate and toggle between different light patterns to provide the data reader 10 with sufficient flexibility to read DPM codes 15 from a variety of items 25. Example embodiments of such illumination systems 100, 200, 300, 400 are described in further detail below with reference to FIGS. 2-12.

Figure 2:
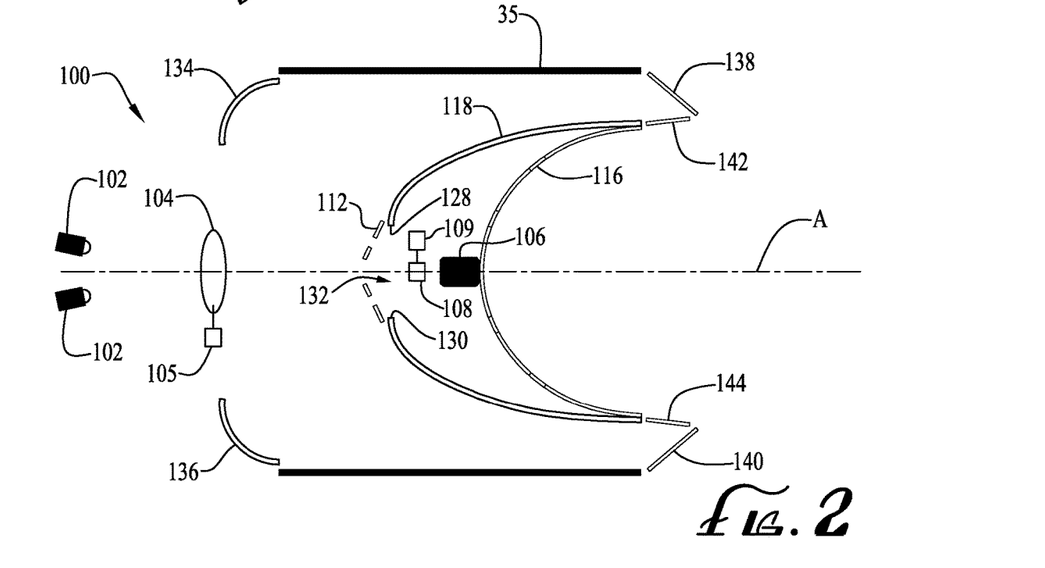
FIGS. 2-4 illustrate an example embodiment of an illumination system of the data reader of FIG. 1, the illumination system including a lens for controlling the optical path of the illumination and creating different light patterns.
Figure 3:
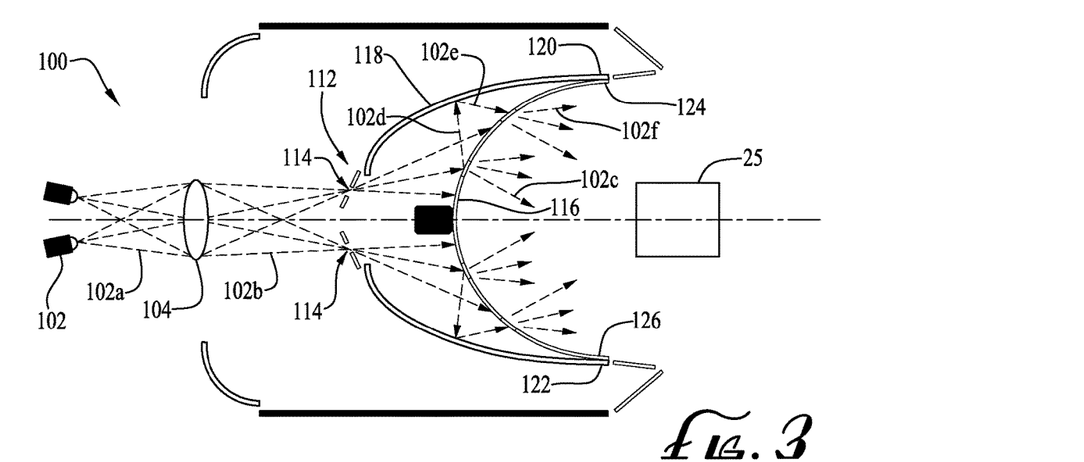
Figure 4:
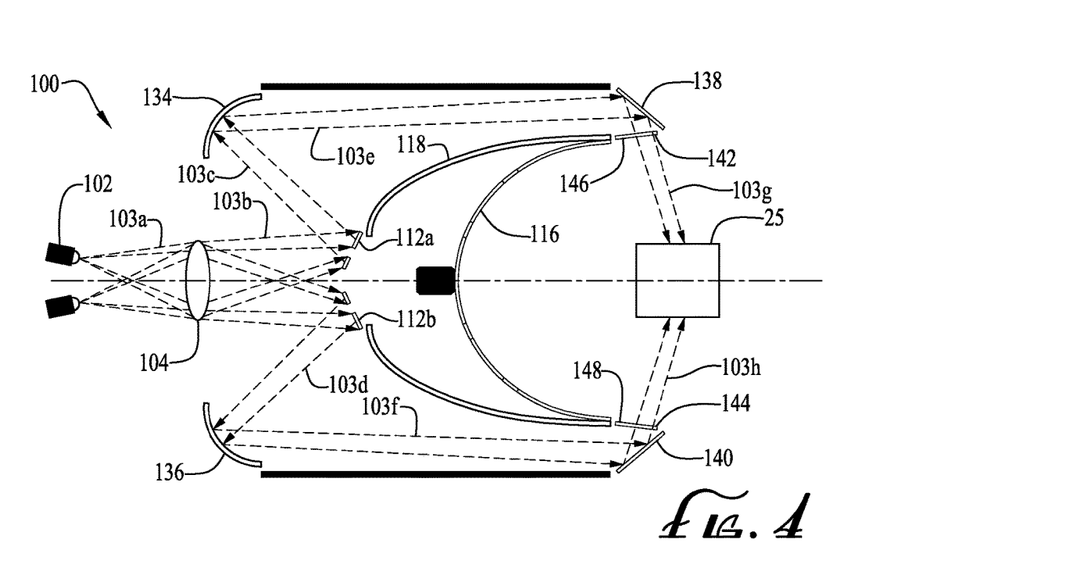

FIGS. 2-4 illustrate an example embodiment of an illumination system 100 operable to generate multiple light patterns for the data reader 10. In some example embodiments, the illumination system 100 uses a common illumination source or sources 102 and an active element 104 to generate a diffuse light pattern (FIG. 3) for providing a broad scope of illumination, and a grazing light pattern (FIG. 4) for providing a smaller, target scope of illumination, and other light patterns as further described below. The active element 104 directs light from the illumination source(s) 102 along an optical path toward various optical elements of the illumination system 100 to generate the different light patterns. As is further described in detail below, the light patterns generated by the illumination system 100 are preferably dedicated light patterns that are not activated at the same time to avoid causing potential lighting issues.

FIG. 2 illustrates a schematic diagram of an illumination system 100 arranged within the housing 35 of the data reader 10. With reference to FIG. 2, the illumination system 100 includes a single source or plurality of illumination sources 102 (such as light-emitting diodes) operable to direct light toward an active element 104, which in turn redirects the light from illumination sources 102 to create different light patterns as briefly mentioned previously. Preferably, the active element 104 is arranged such that the active element 104 is substantially centered along the receiving optical axis A, although the active element 104 may be located in a different position in alternate embodiments.

As illustrated in FIGS. 2-4, in one embodiment, the active element 104 may comprise a liquid lens that uses one or more fluids to create an infinitely-variable lens without any moving parts by controlling characteristics of the meniscus (the surface of the liquid). For example, in one embodiment, the liquid lens 104 may include a sealed chamber of oil and water having different indices of refraction, but the same density. Using an electrowetting process, the shape of the oil drop in the chamber may be controlled via an electric field to alter the optical path of the light traveling through the liquid lens 104. As is further described with reference to FIGS. 3 and 4, the liquid lens 104 is operable via a controller 105 to redirect light toward different optical structures to create the diffuse light pattern and the grazing light pattern.

The data reader 10 further includes receiving optics 106, which may include one or more lens assemblies or optical elements (not shown) operable to focus return light from the DPM code 15 and item 25 to form an image on an imager 108. The data reader 10 further includes a decoder unit 109 in communication with the imager 108 and operable to decode the captured DPM code 15. With particular reference to FIGS. 3 and 4, the following section describes further details of the optics arrangement of the illumination system 100 used to generate different light patterns for aiding the image-capture and decoding process of the data reader 10.

FIG. 3 is a schematic diagram illustrating an example optical path for light generated by the illumination sources 102 to create a diffuse light pattern that broadly scatters light from the data reader 10 toward the DPM code 15 and the item 25. The diffuse light pattern may be useful for reading DPM codes 15 from items 25 that may have high surface reflectivity, such as for items 25 having mirror-like or other highly reflective surfaces. Certain components of the data reader 10 have been removed in FIG. 3 for simplicity and to avoid obscuring more pertinent details of the embodiment.

With reference to FIG. 3, the illumination sources 102 generate a first light 102a directed toward the liquid lens 104. The controller 105 generates an electrical current to alter the optical properties of the liquid lens 104 such that the lens 104 redirects the light as a second light 102b forwardly toward a mirror 112. In one embodiment, the mirror 112 includes a plurality of holes, apertures, or other passages 114 formed thereon to allow the light 102b to travel therethrough. In other embodiments, the mirror 112 may include a plurality of individual mirrors spaced apart from each other to create gaps and form a passageway for the light 102b.

The light 102b redirected by the liquid lens 104 travels forwardly through the apertures or gaps 114 in the mirror 112 and toward a window 116 positioned at a front end of the data reader 10, the window 116 comprising transmissive and diffusive optical properties to diffuse the light 102b. Some of the diffused light 102c passes through the window 114, while other light 102d is diffused inwardly within the housing 35 of the data reader 10. The diffused light 102d travels rearwardly and/or sidewardly away from the window 116 and toward a wall 118. The wall 118, comprising both diffusive and reflective optical properties, again diffuses/scatters the light 102e and reflects the light 102e back toward the window 116, where the light 102f illuminates the item 25.

In some embodiments, the wall 118 may have a generally arcuate or curved profile with end portions 128, 130 adjacent to and offset from the mirror 112 to provide sufficient spacing 132 between the end portions 128, 130 to provide a clear passageway for the light traveling through or between the mirror 112. In other embodiments, end portions 120, 122 of the wall 118 are fixedly attached to end portions 124, 126, respectively, of the window 116 to minimize any gaps and avoid having light escape therebetween. Accordingly, most of the light generated by the illumination sources 102 travels out the window 114 to illuminate the DPM code 15 on the item 25.

FIG. 4 is a schematic diagram illustrating an example optical path for light generated by the illumination sources 102 to create a grazing light pattern that yields a more narrowly focused pattern of light toward the item 25 as compared to the diffuse light pattern of FIG. 3. In some embodiments, the grazing light pattern may be useful to provide sufficient illumination for item surfaces comprising engraved scannable media (e.g., engraved in plastic or metal surface).

With reference to FIG. 4, the illumination system 100 includes a pair of collimating mirrors 134, 136 laterally offset from one another and generally positioned on opposing sides of the liquid lens 104. In an example operation, the illumination sources 102 generate a first light 103a, which is directed toward the liquid lens 104. The liquid lens 104 in turn redirects the light as a second light 103b toward the mirror 112. An upper portion 112a of the mirror 112 redirects the light 103c sidewardly and rearwardly toward the collimating mirror 134, and a lower portion 112b of the mirror 112 redirects the light 103d sidewardly and rearwardly toward the collimating mirror 136. The collimating mirrors 134, 136 redirect the light 103e, 103f, respectively, forwardly toward an angled deviation mirror 138, 140. The deviation mirrors 138, 140 redirect the light 103g, 103h outwardly through an exit window 142, 144, respectively, and toward the item 25.

In some embodiments, the ends 146, 148 of the exit windows 142, 144 may be affixed to the window 116. In addition, or alternatively, in other embodiments, the deviation mirrors 138, 140 may be attached to the exit windows 142, 144 to ensure that the light is redirected from the deviation mirrors 138, 140 and toward the exit windows 142, 144 to minimize the amount of light that escapes from the housing 35 of the data reader 10.

As mentioned previously, the illumination system 100 illustrated and described with reference to FIGS. 2-4 uses a common illumination source 102 and a fixed arrangement of optical structures, such as a liquid lens 104, mirrors 112, 134, 136, 138, 140, a wall 118, and windows 116, 142, 144 to generate a variety of light patterns for the data reader 10.

In other embodiments, one or more of the mirrors 112, 134, 136, 138, 140 may be movable or rotatable within the housing 35 to provide adaptive control and optimize lighting when desired. For example, the decoder unit 109 (or other processor) may be in operable communication with the deviation mirrors 138, 140 to rotate one or both mirrors 138, 140 based on sampled images of the DPM code 15 received by the imager 108. In one example, the decoder unit 109 may attempt to decode the DPM code 15 and during the decoding step, the decoder unit 109 decodes a partial code but fails to identify a stop sequence. To obtain the missing information, the decoder unit 109 may send a signal (or otherwise instruct another processor or subsystem to send a signal) to rotate the mirrors 138, 140 and optimize the illumination of the DPM code 15 for a subsequent reading attempt.

FIGS. 5-8 described in further detail below illustrate another embodiment of an illumination system 200 that uses a similar optical arrangement as the embodiment described in FIGS. 2-4 to produce different light patterns and allow the data reader 10 to read DPM codes 15 from an item 25. As is illustrated in FIGS. 5-8, illumination system 200 may include the same or similar components arranged in the same or similar fashion as those described in illumination system 100. For ease of reference, such components may be referred to by the same description and designated with analogous reference numbering. For example, the illumination system 200 includes receiving optics 206, a transmissive, diffusive window 216, a reflective, diffusive wall 218, collimating mirrors 234, 236, deviation mirrors 238, 240, and exit windows 242, 244. It should be understood that in some embodiments these components are arranged and operate in a similar fashion as those described previously with respect to the illumination system 100 unless otherwise stated. Accordingly, additional details of these components are not further described in detail to avoid repetition.

Figure 5:
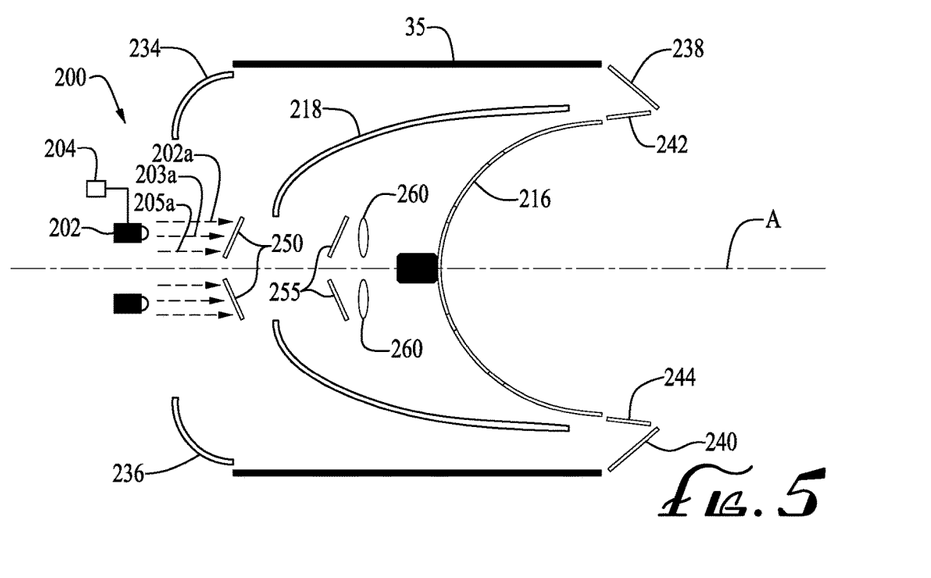
FIGS. 5-8 illustrate another example embodiment of the illumination system of the data reader of FIG. 1, the illumination system including an arrangement of multi-colored illumination sources for creating different light patterns.

FIG. 5 illustrates a schematic diagram of an illumination system 200 arranged within the housing 35 of the data reader 10 for generating illumination to allow the data reader 10 to read a DPM code 15 on an item 25. With reference to FIG. 5, the illumination system 200 includes a plurality of illumination sources 202 operable to generate RGB (red, green, blue) light, and an active driver 204 in communication with the illumination sources 202 to control the wavelength of light (i.e., the color of light) produced by the illumination sources 202. As is explained in further detail below, the selected wavelength of light produced by the illumination sources 202 allows the data reader 10 to generate multiple light patterns.

The illumination system 200 further includes a first mirror pair 250 and a second mirror pair 255. The mirror pairs 250, 255 each comprise a first mirror 250a, 255a, and a second mirror 250b, 255b, where the first mirrors 250a, 255a are aligned relative to one another and offset from the optical axis A, and the second mirrors 250b, 255b are also aligned relative to one another and offset from the optical axis A. The mirror pairs 250, 255 each include wavelength selective reflective optics (e.g., a multilayer coating tuned to a specific wavelength) so as to reflect light of a specific wavelength and otherwise allow other light of a different wavelength to pass through. For example, in the embodiment described with respect to FIGS. 6 and 7, the first and second mirrors 250a, 250b in the mirror pair 250 may each be coated to reflect light having a wavelength that corresponds to red light (e.g., a wavelength ranging between 620-750 nm), and the first and second mirrors 255a, 255b in the mirror pair 255 may each be coated to reflect light having a wavelength that corresponds to blue light (e.g., a wavelength ranging between 450-495 nm). It should be understood that in other embodiments, the coating on the mirror pairs 250, 255 may be different than the embodiment described to allow different wavelengths to reflect or pass through as desired. For example, mirrors 250a, 250b may be coated to reflect blue light, and the mirrors 255a, 255b may be coated to reflect red light, or the mirrors 250a, 250b may be coated to reflect green light and the mirrors 255a, 255b may be coated to reflect blue light. It should be understood that any combination of wavelength selective reflective optics may be used in conjunction with the mirrors 250, 255 without departing from the principles of the described embodiments.

The illumination system 200 further includes a lens group 260 comprising a first lens 260a and a second lens 260b offset from one another. In some embodiments, the first lens 260a is aligned with the first mirrors 250a, 255a of each of the first and second mirror pairs 250, 255, and the second lens 260b is aligned with the second mirrors 250b, 255b. The lens group 260 is operable to focus light received from the illumination sources 202 through the window 216 and onto the item 25. As further described in detail below with respect to FIGS. 6-8, the mirror pairs 250, 255 and the lens group 260 cooperate to allow the data reader 10 to generate multiple light patterns as needed. The following describes examples of different light patterns that the data reader 10 is capable of generating using the common light source 202 and optical arrangement.

Figure 6:
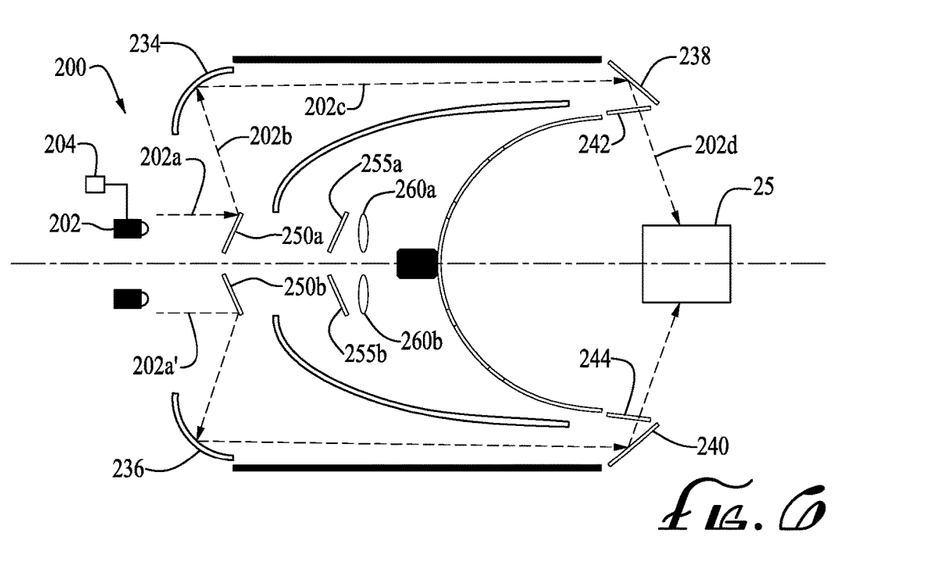

With reference to FIG. 6, in one embodiment, the active driver 204 sends a signal to the illumination source 202 to produce light having a wavelength in the red spectrum, thereby producing red light 202a. The red light 202a is directed toward the first mirror pair 250 coated to reflect red light, at which the light 202b is reflected sidewardly and rearwardly by the first mirror 250a toward the collimating mirror 234. The collimating mirror 234 in turn redirects the red light 202c forwardly toward the deviation mirror 238, which directs the red light 202d through the exit window 242 to illuminate the item 25 with a grazing light pattern. Red light 202a' follows a similar optical path off the second mirror 250b, the collimating mirror 236, the deviation mirror 240, and exits through the window 244 to illuminate the item 25.

Figure 7:
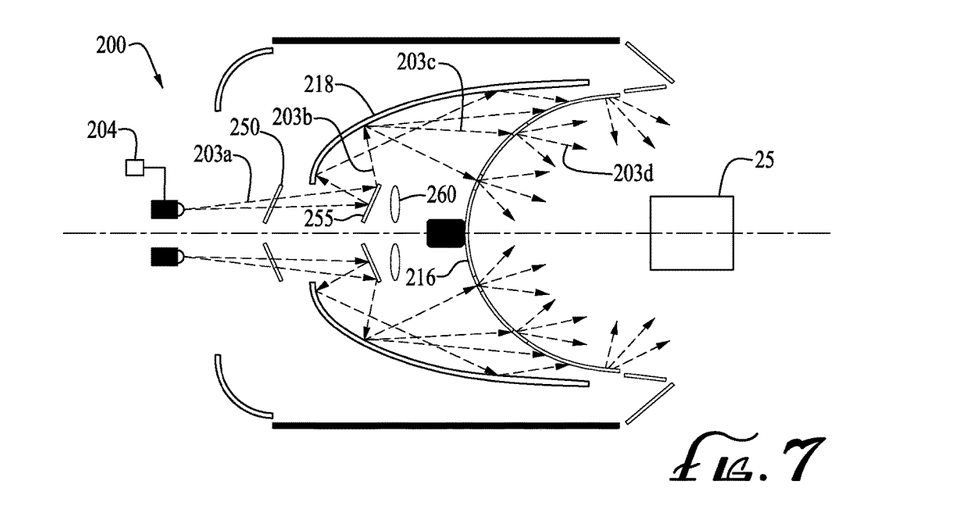

With reference to FIG. 7, in another embodiment, the active driver 204 sends a signal to the illumination source 202 to produce light having a wavelength in the blue spectrum, thereby producing blue light 203a. The blue light 203a is directed toward the first mirrors 250a, 250b. Since the first mirrors 250a, 250b are each coated to reflect red light but otherwise allows other colored light to pass through, the blue light 203a passes through the first mirrors 250a, 250b and toward the second mirrors 255a, 255b. When the blue light 203a reaches the second mirrors 255a, 255b, the blue light 203b is redirected toward the reflective, diffusive wall 218, where the blue light 203c is reflected and diffused toward the window 216. Thereafter, the blue light 203e exits the window 216 to illuminate the item 25 with a diffuse light pattern.

Figure 8:
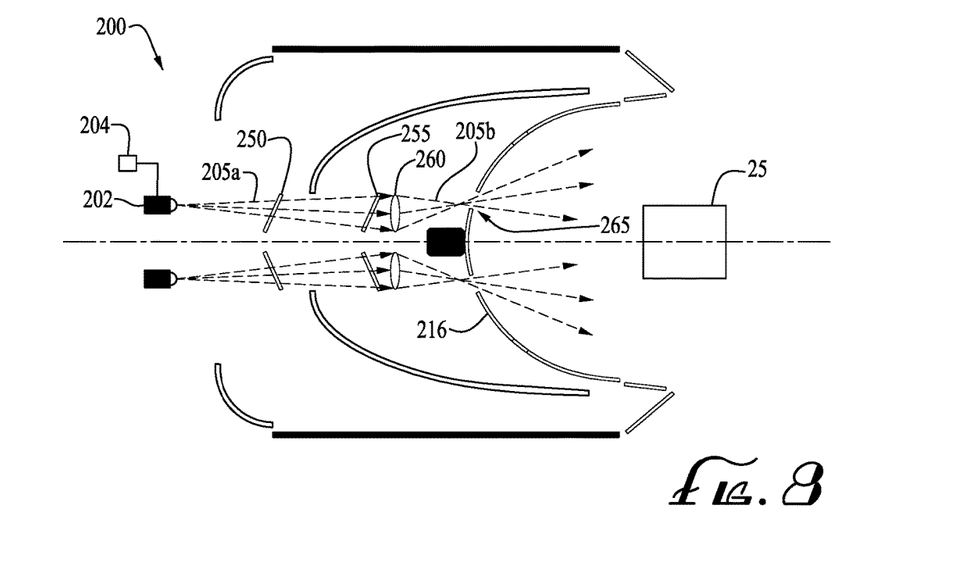

With reference to FIG. 8, in another embodiment, the active driver 204 sends a signal to the illumination source 202 to produce light having a wavelength for the green spectrum, thereby producing green light 205a. The green light 205a passes through both the first mirrors 250a, 255b and the second mirrors 255a, 255b without being redirected since none of the mirrors 250a, 250b, 255a, 255b includes a coating tuned specifically for green light 205a. Accordingly, the green light 205a passes through the mirrors 250a, 250b, 255a, 255b and reaches the lens group 260, where the green light 205b is focused by the lens group 260 through a hole or gap 265 (enlarged in FIG. 8 for illustration purposes) formed on the window 216. The green light 205b passes through the gap 265 of the window 216 and illuminates the item 25 with a bright light pattern.

The embodiments described in FIGS. 5-8 illustrate another embodiment of the illumination system 200 having an active driver 204 operable to generate a specific wavelength of light from the illumination sources 202. Depending on the wavelength of the generated light, the light reacts with passive, stationary elements (e.g., the mirrors 250, 255 or the lens group 260) to produce different light patterns for the data reader 10.

Figure 9:
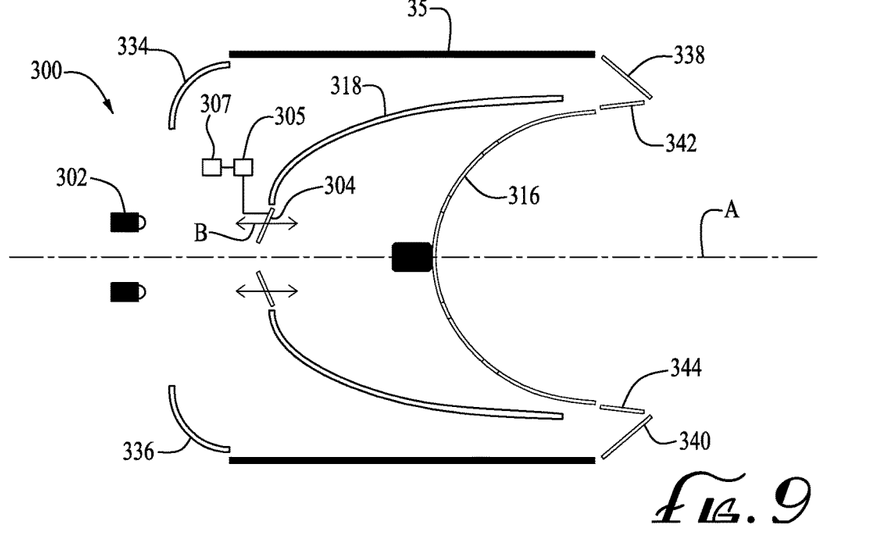
FIGS. 9-11 illustrate another example embodiment of the illumination system of the data reader of FIG. 1, the illumination system including a movable mirror for controlling the optical path of the illumination and creating different light patterns.
Figure 10:
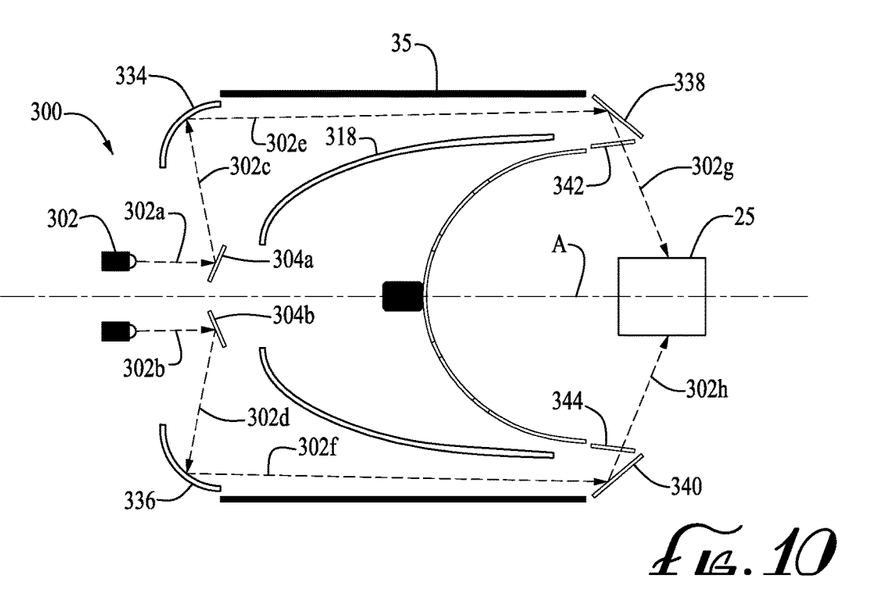
Figure 11:
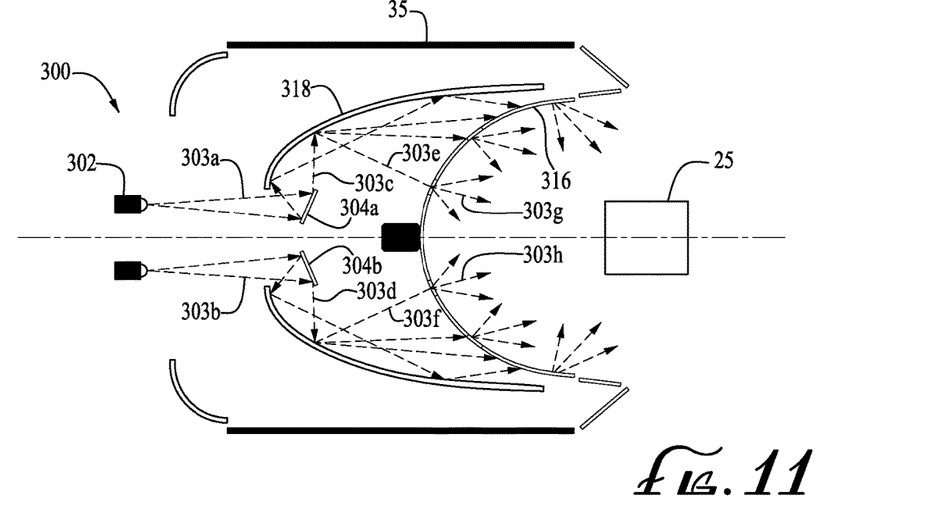

With reference to FIGS. 9-11, the following illustrates yet another embodiment of an illumination system 300 that uses a similar optical arrangement as the embodiments described previously to produce different light patterns and allow the data reader 10 to read DPM codes 15 from an item 25. As is illustrated in FIGS. 9-11, the illumination system 300 may include the same or similar components arranged in the same or similar fashion as those described in illumination systems 100, 200. Accordingly, to avoid repetition, such similar components will not be further described in detail. For ease of reference, such components may be referred to using the same description and designated with analogous reference numbering.

FIG. 9 illustrates a schematic diagram of an illumination system 300 arranged within the housing 35 of the data reader 10 for generating illumination to allow the data reader 10 to read a DPM code 15 from an item 25. With reference to FIG. 9, the illumination system 300 includes a single or plurality of illumination sources 302 (such as light-emitting diodes) operable to direct light toward an active element 304, which in turn redirects the light from illumination sources 302 to create different light patterns. As illustrated in FIG. 9, in one embodiment, the active element may comprise mirrors 304a, 304b, where each of the mirrors 304a, 304b is movable or translatable along an axis B. As is further described in detail below with reference to FIGS. 10 and 11, based on the position of the mirrors 304a, 304b, the light generated by the illumination sources 302 is redirected toward different optical structures to generate different light patterns for improved data reading.

The illumination system 300 includes a driver mechanism 305 in operable communication with a processor 307 and with the mirrors 304a, 304b. The mirror pair 304 includes a first mirror 304a and a second mirror 304b, each of which is movable or translatable along an axis B (see FIGS. 10-11). The axis B is preferably offset and parallel to the optical axis A and also offset from the diffusive wall 318 to allow the mirror pair 304 to move along the axis B and relative to the diffusive wall 318 without obstruction as further described below.

FIG. 10 illustrates an embodiment of the illumination system 300 for generating a grazing light pattern. With general reference to FIGS. 9-10, in response to receiving a user selection of the grazing light pattern (such as via the input mechanism 65 on the data reader 10), the processor 307 transmits a signal to the driver mechanism 305 to position the mirror pair 304 in accordance with the selected light pattern. In some embodiments, the mirrors 304a, 304b may be positioned on a track (not shown) and the driver mechanism 305 may move the mirrors 304a, 304b along the track in response to instructions from the processor 307.

To generate a grazing light pattern, the driver mechanism 305 moves the mirrors 304a, 304b along the axis B to a first position, at which the mirrors 304a, 304b are each outside and in front of the diffusive wall 318. With the mirrors 304a, 304b in the first position, the light 302a, 302b generated by the illumination sources 302 is reflected sidewardly by the mirrors 304a, 304b toward the collimating mirrors 334, 336. The collimating mirrors 334, 336 in turn redirect the light 302c, 302d forwardly toward the deviation mirrors 338, 340, which in turn direct the light 302e, 302f through the exit windows 342, 344, where light 302g, 302h illuminates the item 25.

In some embodiments, the driver mechanism 305 and processor 307 may be further operable to rotate the mirrors 304a, 304b about the axis B to adjust the angle of the grazing light pattern exiting from the windows 342, 344 to adjust or tailor the grazing light pattern as needed. In addition, as noted in previous embodiments, the deviation mirrors 338, 340 may also be rotated to adjust the grazing light pattern exiting the windows 342, 344.

FIG. 11 illustrates an embodiment of the illumination system 300 for generating a diffuse light pattern. With general reference to FIGS. 9 and 11, in response to receiving a user selection of the diffuse light pattern, the processor 307 transmits a signal to the driver mechanism 305 to position the mirrors 304a, 304b in accordance with the selected light pattern. To generate a diffuse light pattern, the driver mechanism 305 moves the mirrors 304a, 304b along the axis B to a second position, at which the mirrors 304a, 304b are generally housed within the diffusive wall 318. With the mirrors 304a, 304b in the second position, the illumination sources 302 generate illumination 303a, 303b directed toward the mirrors 304a, 304b, which redirects light 303c, 303d sidewardly toward the reflective, diffusive wall 318.

The wall 318 in turn diffuses and reflects light 303e, 303f toward the window 316, through which the light 303g, 303h exits to illuminate the item 25.

Figure 12:
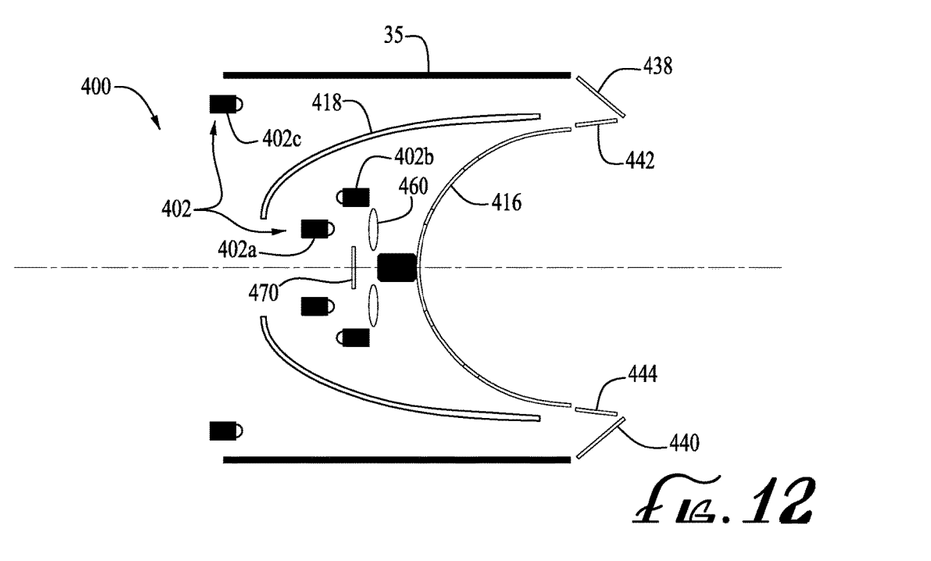
FIGS. 12-13 illustrate another example embodiment of the illumination system using another arrangement of multiple-color illumination sources to create different light patterns.
Figure 13:
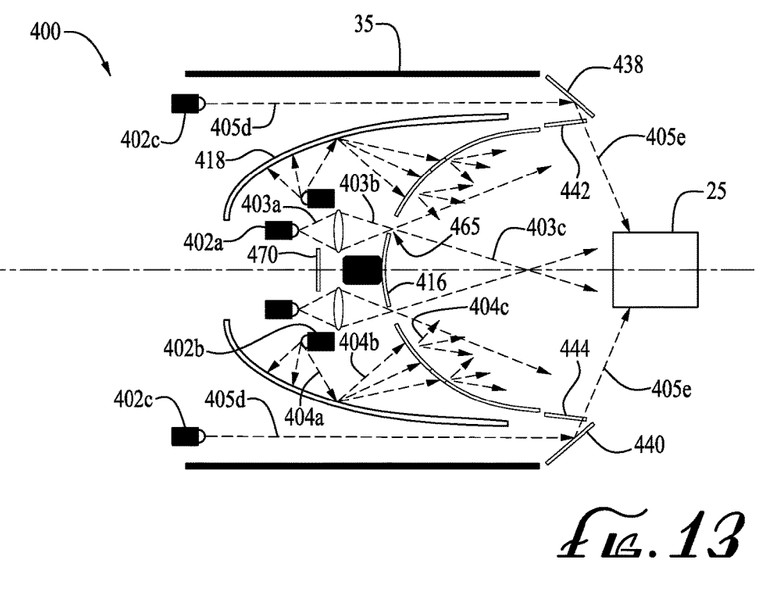

FIGS. 12 and 13 illustrate another embodiment of an illumination system 400 that uses a similar optical arrangement as the previously described embodiments to produce different light patterns and allow the data reader 10 to read DPM codes 15 from an item 25. As is illustrated in FIGS. 12-13, illumination system 400 may include the same or similar components arranged in the same or similar fashion as those described in illumination systems 100, 200, 300. Accordingly, to avoid repetition, such similar components will not be further described in detail. For ease of reference, such components may be referred to by the same description and designated with analogous reference numbering.

FIG. 12 illustrates a schematic diagram of an illumination system 400 arranged within the housing 35 of the data reader 10 for generating illumination to aid the data reader 10 in reading the DPM code 15 from the item 25. With reference to FIG. 12, the illumination system 400 includes a plurality of illumination sources 402 operable to generate RGB (red, green, blue) light, or other colored lights in other embodiments. The illumination sources 402 may include dedicated colored light sources 402a, 402b, 402c, each generating light at a specific wavelength to produce individual beams of red, green, and blue light. It should be understood that while the foregoing written description may associate a specific light color with each of the sources 402a, 402b, 402c, this designation is for convenience purposes only and not meant to be limiting.

With reference to FIGS. 12 and 13, the plurality of illumination sources 402 are activated to direct colored light to various different optical structures to generate different light patterns for the data reader 10. Preferably, both the red and blue light sources 402a, 402b are positioned between the wall 418 and the window 416. In some embodiments, the blue light source 402a directs light 403a toward a lens group 460. The lens group 460 receives blue light 403a and focuses blue light 403b through one or more holes, gaps, or apertures 465 formed on the window 416, where light 403c illuminates the item 25 with a bright light pattern. The red light source 402b, which is offset from the blue light source 402a, directs red light 404a toward the reflective, diffusive wall 418, where red light 404b is reflected and diffused toward the window 416. The red light 404c exits the window 416 to provide a diffused light pattern and illuminate the item 25. The green light source 402c is arranged outside the wall 418 and directs green light 405d forwardly toward the deviation mirrors 438, 440. The deviation mirrors 438, 440 in turn direct the green light 403e through the exit windows 442, 444 to illuminate the item 25.

In some embodiments, some or all of the colored illumination sources 402 may be activated simultaneously to generate three different colored light patterns. In such embodiments, the data reader 10 may further include a color sensor, such as an RGB sensor, 470 operable to detect the reflected light from the DPM code 15 and determine which light source (e.g., which of the colored illumination) best captures the DPM code 15. In some embodiments, the color sensor 470 may be an integral component of the imager 408 or may be a standalone unit in operable communication with the imager 408.

It is intended that subject matter disclosed in any one portion herein can be combined with the subject matter of one or more other portions herein as long as such combinations are not mutually exclusive or inoperable. In addition, many variations, enhancements and modifications of the imager-based optical code reader concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A data reader for reading data from items, the data reader comprising:
  a housing;
  an imager carried within the housing, the imager operable to form an image of a decodable code from an item located in a field of view of the data reader; and
  an illumination system carried within the housing, the illumination system comprising:
    one or more illumination sources operable for emanating light; and
    an optics system arranged to direct the light emanating from the one or more illumination sources outwardly of the housing to illuminate the field of view of the data reader, the optics system comprising:
      a first mirror and a second mirror, the first mirror arranged to direct the light emanating from at least one of the one or more illumination sources toward the second mirror along a first optical path, wherein the second mirror redirects the light outwardly of the housing to illuminate the field of view with a first light pattern;
      a window operable to allow at least a first portion of the light emanating from at least one of the one or more illumination sources to pass through the window and toward the field of view;
      a wall having a reflective surface, the reflective surface receiving at least a second portion of the light emanating from at least one of the one or more illumination sources and reflecting the light along a second optical path and through the window to illuminate the field of view with a second light pattern; and
      an active element controllable to selectively direct the light emanating from at least one of the one or more illumination sources along the first optical path associated with the first light pattern and along the second optical path associated with the second light pattern.

2. The data reader of claim 1, wherein the first mirror includes one or more apertures extending therethrough, and wherein the active element is further controllable to selectively direct the light through the one or more apertures along the second optical path to illuminate the field of view with the second light pattern.

3. The data reader of claim 2, wherein the active element is a liquid lens.

4. The data reader of claim 1, wherein the wall further includes diffusive properties to diffuse the light emanating from the illumination sources toward the window, and wherein the window is a diffusive window operable to diffuse at least a third portion of the light emanating from the illumination sources toward a portion of the wall.

5. The data reader of claim 1, further comprising a third mirror and an exit window adjacent the third mirror, wherein the second mirror is arranged to direct the light toward the third mirror, and wherein the third mirror is arranged to direct the light toward the exit window to illuminate the field of view with the first light pattern.

6. The data reader of claim 5, wherein the first and second mirrors are stationary and the third mirror is movable to adjust the first optical path of the light.

7. The data reader of claim 1, wherein the one or more illumination sources are operable to generate light of a first wavelength and light of a second wavelength, and wherein the first mirror includes wavelength selective reflective optics to reflect light of the first wavelength toward the second mirror along the first optical path, the illumination system further comprising a third mirror arranged in substantial alignment with the first mirror, the third mirror including wavelength selective reflective optics to reflect light of the second wavelength toward the reflective wall along the second optical path.

8. The data reader of claim 7, wherein the one or more illumination systems are further operable to generate light of a third wavelength, the illumination system further comprising a lens element in substantial alignment with the first and third mirrors, the lens element directing the light of the third wavelength toward the window along a third optical path to illuminate the field of view with the third light pattern of the data reader.

9. The data reader of claim 8, wherein the window further includes one or more apertures extending therethrough, wherein the light traveling along the third optical path passes through the apertures to illuminate the field of view with the third light pattern.

10. The data reader of claim 8, wherein the active element is a controller in communication with the one or more illumination sources, the controller operable to control a wavelength of the light emanating from the one or more illumination sources to selectively control which of the first, second, or third light patterns illuminates the field of view.

11. The data reader of claim 7, wherein the active element is operable to drive the one or more illumination systems to generate light of both the first and second wavelengths concurrently to simultaneously illuminate the field of view with both the first and second light patterns.

12. The data reader of claim 1, wherein the first mirror is movable along an axis between a first position and a second position, wherein when the first mirror is in the first position, the first mirror directs the light emanating from the one or more illumination sources toward the second mirror along the first optical path, and wherein when the first mirror is in the second position, the first mirror directs the light emanating from the one or more illumination sources toward the wall along the second optical path.

13. The data reader of claim 12, wherein the active element is a driver mechanism in communication with the first mirror and selectively operable to move the first mirror along the axis between the first and second positions.

14. The data reader of claim 1, further comprising a decoder for decoding at least a portion of the decodable code.

15. A data reader for reading data from items, the data reader comprising:
  a housing;
  an imager carried within the housing, the imager operable to form an image of a decodable code from an item located in a field of view of the data reader; and
  an illumination system carried within the housing, the illumination system comprising:
    a plurality of illumination sources operable for emanating light; and
    an optics system arranged to direct light from the one or more illumination sources outwardly of the housing to illuminate the field of view of the data reader, the optics system comprising:
      a first mirror arranged to direct light emanating from a first illumination source of the plurality of illumination sources toward an exit window along a first optical path, the light passing through the exit window to illuminate the field of view with a first light pattern;
      a lens element arranged to direct light emanating from a second illumination source of the plurality of illumination sources toward a window along a second optical path, the light passing through the window to illuminate the field of view with a second light pattern;
      a wall having a reflective surface, the reflective surface receiving at least a portion of light emanating from a third illumination source of the plurality of illumination sources and reflecting the light along a third optical path and through the window to illuminate the field of view with a third light pattern; and
      an active element controllable to selectively operate the plurality of illumination sources.

16. The data reader of claim 15, the window further including apertures extending therethrough, wherein the lens element is arranged to direct light through the apertures.

17. The data reader of claim 15, wherein the first, second, and third illumination sources are operable to generate light of different wavelengths.

18. The data reader of claim 15, wherein the first mirror is movable to adjust the first optical path and the first light pattern of the data reader.

19. A method of data reading, comprising:
  activating one or more illumination sources carried within a housing of the data reader to emanate light therefrom;
  selectively directing, via an active element, the light from the one or more illumination sources along a first optical path associated with a first light pattern or along a second optical path associated with a second light pattern;
  for the first optical path:
    directing a first light portion from the one or more illumination sources toward a first mirror;
    redirecting the light from the first mirror toward a second mirror along a first optical path; and
    redirecting the light from the second mirror outwardly of the housing to illuminate a field of view of the data reader with a first light pattern;
  for the second optical path:
    directing a second light portion from the one or more illumination sources toward a window, wherein a first portion of the second light portion passes through the window and toward the field of view;
    redirecting, via the window, a second portion of the second light portion toward a wall having diffusive and reflective optical properties;
    reflecting, via the wall, the second portion of the second light portion back toward the window along a second optical path, wherein the second portion of the second light portion passes through the window to illuminate the field of view of the data reader with a second light pattern; and
  forming an image of a decodable code from an item located in the field of view of the data reader, wherein the field of view of the data reader is illuminated with one or both of the first and second light patterns.

* * * * *